United States Patent
Thiagarajan et al.

(10) Patent No.: US 10,154,288 B2
(45) Date of Patent: Dec. 11, 2018

(54) APPARATUS AND METHOD TO IMPROVE IMAGE OR VIDEO QUALITY OR ENCODING PERFORMANCE BY ENHANCING DISCRETE COSINE TRANSFORM COEFFICIENTS

(71) Applicant: MatrixView, Inc., Sunnyvale, CA (US)

(72) Inventors: Arvind Thiagarajan, Sunnyvale, CA (US); Ravilla Jaisimha, Sunnyvale, CA (US)

(73) Assignee: MatrixView, Inc., Sunnyvale, CA (US)

( * ) Notice: Subject to any disclaimer, the term of this patent is extended or adjusted under 35 U.S.C. 154(b) by 60 days.

(21) Appl. No.: 15/447,755

(22) Filed: Mar. 2, 2017

(65) Prior Publication Data

US 2017/0257645 A1 Sep. 7, 2017

Related U.S. Application Data

(60) Provisional application No. 62/302,436, filed on Mar. 2, 2016.

(51) Int. Cl.
| | |
|---|---|
| *H04N 7/12* | (2006.01) |
| *H04N 11/02* | (2006.01) |
| *H04N 11/04* | (2006.01) |
| *H04N 19/625* | (2014.01) |
| *H04N 19/18* | (2014.01) |
| *H04N 19/124* | (2014.01) |
| *H04N 19/126* | (2014.01) |
| *H04N 19/176* | (2014.01) |
| *G10L 19/00* | (2013.01) |

(52) U.S. Cl.
CPC ............ *H04N 19/625* (2014.11); *G10L 19/00* (2013.01); *H04N 19/124* (2014.11); *H04N 19/126* (2014.11); *H04N 19/176* (2014.11); *H04N 19/18* (2014.11)

(58) Field of Classification Search
CPC ..... H04N 19/124; H04N 19/18; H04N 19/625
See application file for complete search history.

(56) References Cited

U.S. PATENT DOCUMENTS

| | | | | |
|---|---|---|---|---|
| 5,740,284 | A * | 4/1998 | Wober | ................. G06F 17/147 348/E9.01 |
| 9,264,724 | B2 | 2/2016 | Wang et al. | |
| 9,313,498 | B2 | 4/2016 | Sole Rojals et al. | |
| 2003/0202713 | A1* | 10/2003 | Sowa | ........................ G06T 5/20 382/260 |

(Continued)

OTHER PUBLICATIONS

Discrete cosine transform, Wikipedia, https://en.wikipedia.org/wiki/Discrete_cosine_transform, Feb. 21, 2016, pp. 1 to 14.

*Primary Examiner* — Rebecca A Volentine
(74) *Attorney, Agent, or Firm* — Pillsbury Winthrop Shaw Pittman LLP (57) ABSTRACT

Provided is a process for compressing data that includes: obtaining data to be compressed; compressing the data with a first DCT compression algorithm to obtain a first DCT amplitude matrix; compressing the data with a second DCT compression algorithm to obtain a second DCT amplitude matrix, the second DCT compression algorithm compressing the data more than the first algorithm; modifying the second DCT amplitude matrix based on a value in the first DCT amplitude matrix.

20 Claims, 6 Drawing Sheets

(56) References Cited

U.S. PATENT DOCUMENTS

| | | | |
|---|---|---|---|
| 2010/0086028 A1* | 4/2010 | Tanizawa | H04N 19/176 375/240.12 |
| 2010/0260268 A1 | 10/2010 | Cowan et al. | |
| 2011/0135212 A1* | 6/2011 | Alshina | H04N 19/176 382/250 |
| 2012/0287987 A1 | 11/2012 | Budagavi et al. | |
| 2013/0051457 A1 | 2/2013 | Joshi et al. | |
| 2013/0064466 A1* | 3/2013 | Carmel | H04N 19/176 382/252 |
| 2013/0177079 A1 | 7/2013 | Kim et al. | |
| 2013/0294524 A1 | 11/2013 | Van Der et al. | |
| 2013/0336594 A1* | 12/2013 | Dorairaj | H04N 19/126 382/250 |
| 2015/0010068 A1 | 1/2015 | Francois et al. | |
| 2015/0139303 A1 | 5/2015 | Sato | |
| 2016/0021373 A1* | 1/2016 | Queru | H04N 19/136 382/239 |
| 2016/0212433 A1 | 7/2016 | Zhu et al. | |
| 2016/0225124 A1 | 8/2016 | Orio et al. | |

* cited by examiner

APPARATUS AND METHOD TO IMPROVE IMAGE OR VIDEO QUALITY OR ENCODING PERFORMANCE BY ENHANCING DISCRETE COSINE TRANSFORM COEFFICIENTS

CROSS-REFERENCE TO RELATED APPLICATIONS

The present application claims the benefit of U.S. Provisional Patent Application 62/302,436, filed 2 Mar. 2016, titled "Apparatus and Method to Improve Image or Video Quality or Encoding Performance by Enhancing Discrete Cosine Transform Coefficients". The entire content of each aforementioned parent patent filing is hereby incorporated by reference

BACKGROUND

1. Field

The present invention relates generally to image compression and, more specifically, the computer-implemented techniques to improve image or video quality or encoding performance by enhancing discrete cosine transform coefficients.

2. Description of the Related Art

Data compression underlies much of modern information technology infrastructure. Compression is often used before storing data, to reduce the amount of media consumed and lower storage costs. Compression is also often used before transmitting the data over some media to reduce the bandwidth consumed. Certain types of data are particularly amenable to compression, including images (e.g., still images or video) and audio.

Prior to compression, data is often obtained through sensors, data entry, or the like, in a format that is relatively voluminous. Often the data contains redundancies that can be leveraged to reduce the amount of data needed to represent the original data. Further, in some cases, end users are not particularly sensitive to portions of the data, and these portions can be discarded to reduce the amount of data used to represent the original data. Compression can, thus, be lossless or, when data is discarded, "lossy," in the sense that some of the information is lost in the compression process.

A common technique for lossy data compression is the Discrete Cosine Transform (DCT). Data is generally represented as the sum of cosine functions at various frequencies, with the amplitude of the function at the respective frequencies being modulated to produce a result that approximates the original data. At higher compression rates, however, a blocky artifact appears that is undesirable. Complicating this issue, in many use cases, it is difficult to select other compression techniques because of considerable existing investment premised on the use of DCT.

SUMMARY

The following is a non-exhaustive listing of some aspects of the present techniques. These and other aspects are described in the following disclosure.

Some aspects include a process for compressing data that includes: obtaining data to be compressed; compressing the data with a first DCT compression algorithm to obtain a first DCT amplitude matrix; compressing the data with a second DCT compression algorithm to obtain a second DCT amplitude matrix, the second DCT compression algorithm compressing the data more than the first algorithm; modifying the second DCT amplitude matrix based on a value in the first DCT amplitude matrix.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of data compression. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

Some embodiments modify certain DCT matrix values to improve the effectiveness of compression. Embodiments adjust lower-frequency amplitudes to more closely match between lower compression rates and higher (e.g., more lossy) compression rates. In many forms of DCT, a matrix is produced, with the first row and column value being a non-oscillating (DC) value, and the adjacent values being the primary oscillating (AC) components (e.g., at progressively higher frequencies further from the DC component along rows or columns of the matrix). Some embodiments compress an image at two different rates, one high and one low. In some embodiments, the DC value (and in some cases AC values of less than a threshold frequency) in the more highly compressed matrix values are set to match those in the less compressed version.

Observed results significantly reduce the "blocky" artifact, without significantly impairing the effectiveness of compression. As a result, it is expected that a given bit-rate for transmission can deliver higher fidelity data, or a given level of fidelity can be delivered at a lower bit rate. For example, the present techniques may be used for improving video broadcasting (e.g., a broadcaster that desires to compress video before distributing via satellite, e.g., from 50 megabits per second (Mbps) to 7 Mbps, may use the technique to compress further at the same quality, or offer better quality at the same bit rate), improving online video streaming or video upload from mobile devices to the same ends. Some embodiments may support a service by which mobile devices are used for fast, on-the-fly video editing, e.g., a hosted service by which video files in the cloud can be edited with a mobile device to quickly compose a video about what the user is experience, e.g., at a basketball game.

In some embodiments, the techniques may be implemented in software (e.g., in a video or audio codec) or hardware (e.g., encoding accelerator circuits). The process may begin with obtaining data to be compressed (e.g., a file or segment of a stream, like a video frame). Examples include a raw image file or a feed from a microphone (e.g., in mono or stereo).

Figure 1:
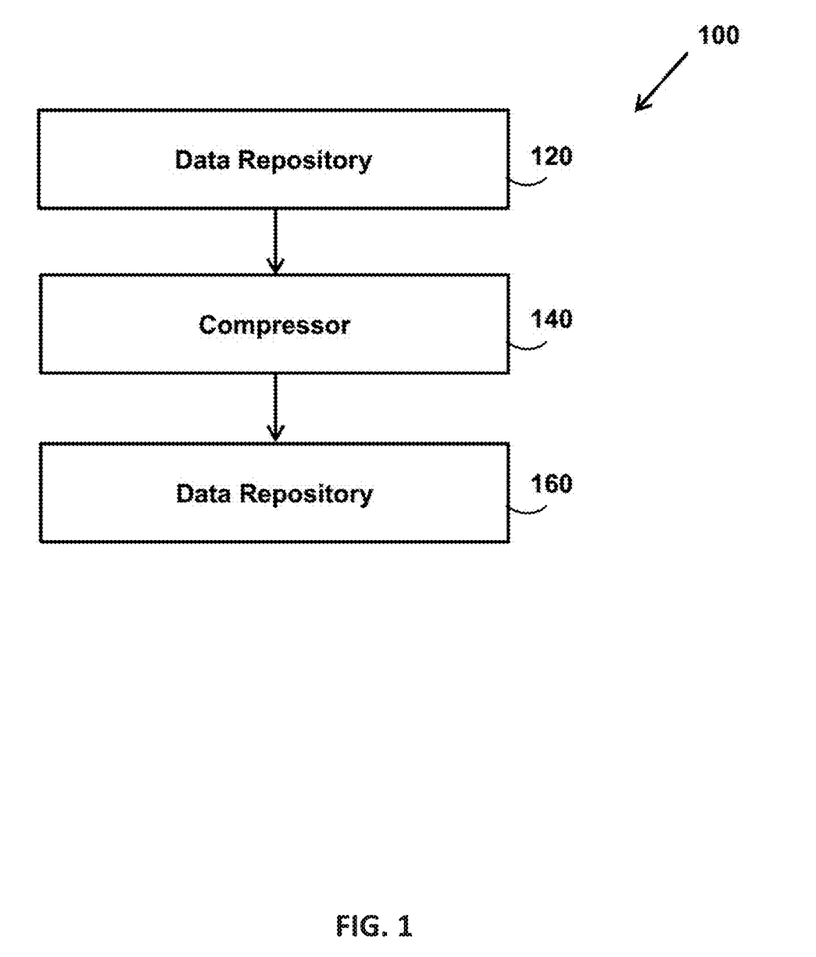
FIG. 1 illustrates an example of a system by which some embodiments of the present techniques may be implemented.

FIG. 1 illustrates an embodiment of system 100 configured to mitigate a variety of problems, both those explicitly discussed below, and those implicit in the description and which will be apparent to those of ordinary skill in the art. In some embodiments, system 100 includes data repository 120, compressor 140, and compressed data repository 160. System 100 may be configured in accordance with the present techniques to compress input data in a relatively effective way. As described below, compressor 140 may use one or more DCT based algorithms to compress input data at different rates (low and high). Values of the low-compressed and high-compressed matrices may be combined to produce a hybrid matrix resulting in compressed data that is substantially smaller than the original input data. Upon decompression, a relatively high-quality representation of the original data is obtained.

Data repository 120 is configured to store input data (in its original form, e.g., text, image, audio, video, multimedia input data, etc.) that will input in compressor 140. Data repository 160 is configured to store output data (compressed). Data repositories 120 and 160 may be an electronic storage configured to store input data. In some embodiments, input data may be directly input into compressor 140 without being stored in data repository 210 (for example, directly uploaded from a sensor, data entry, etc.). In some embodiments, output data (compressed) may be directly transmitted without being stored in data repository 160. In some embodiments, Data repositories 120 and 160 may be electronic storage (which also includes magnetic and optical storage, as well as in-memory storage in DRAM) may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), or other electronically readable storage media. In some embodiments, Data repositories 120 and 160 may include one or more virtual storage resources (e.g., cloud storage, a virtual private network, or other virtual storage resources).

In some embodiments, compressor 140 is configured to compress input data (in its original form) to facilitate storage or transmission. In general, compressing data reduces information redundancy is reduced by reducing information used to represent the input data (or sometimes eliminating some of the information). Generally, compressing data reduces size, quality (or both) of the input data which in turn reduces costs associated with data storage and transmission bandwidth. In some embodiments, compressor 140 uses one or more compression algorithms to compress input data. In some cases, the compression algorithms may allow the compressed data to be reconstructed in its original form (e.g., for text, source code, computer programs, data files, etc.) These types of compressing algorithms (lossless) may be advantageous in cases where the original input data needs to be preserved, or where the compressed data will be further processed. In some embodiments, compressor 140 uses one or more compression algorithms (lossy) that compress the input data by removing information (deemed not important) from the original input data and allowing partial reconstruction of the original input data. These algorithms (generally used in compressing, media, audio, video, or image files) may be advantageous in cases where size of data is important (for storage or transmission). For example, in the case of audio files, compressor 140 may be an audio compressor. In these embodiments, compressor 140 reduces the size of the audio files by reducing fidelity thereby reducing size and bandwidth needed for storage or transmission of the compressed audio files.

Figure 2:
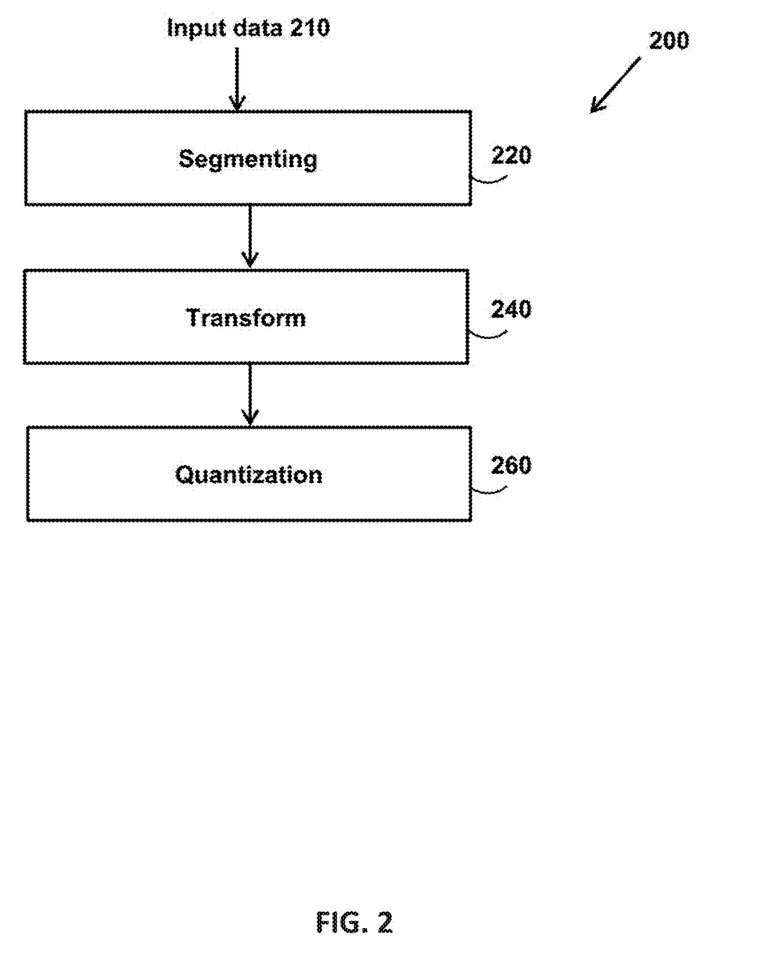
FIG. 2 illustrates an example of a first process by which some embodiments of the present techniques may be implemented.

FIG. 2 illustrates an example of compressing operations 200 of compressor 140 in accordance with some embodiments. In this example, input data 210 (in its original form) is subject to segmenting 220, transform 240, and quantization 260. Output of compressor 140 is compressed data. At operation 220, input data 210 is segmented into segments that will be compressed as a block. Examples include a fixed duration of an audio file or an n-by-n number of pixel intensity values of an image, where n is an integer, like 8 (e.g., 8×8, 16×16, etc.)

In some embodiments, at operation 240, segments are input to a transform to convert time domain sampled waveforms into a transform domain. Generally, the sampled waveforms are transformed into frequency domain. Various types of transforms may be used (e.g., depending on the type of input data). In some embodiments, a discrete cosine transform (DCT) may be used. Generally, a DCT transform is a Fourier related transform that converts a sequence of data points into a sum of cosine functions oscillating at different frequencies. Various types of DCT may be used, ranging from DCT-I to DCT-VIII, with DCT-II being likely choice. Depending on the type of data, a one, two, or three dimensional or higher version of DCT may be used, e.g., one dimensional DCT from audio and two-dimensional for an image. In some cases, the DCT produces a matrix of values with rows and columns corresponding to increasing frequency components and values indicating the amplitude of those components in their respective contribution to the input data.

In some embodiments, at operation 260, the values in the resultant matrix may be quantized to reduce the number of significant digits by which the amplitudes are encoded and, thus, compress the data. In some embodiment, the values in the resultant matrix are quantized by mapping the values to a smaller set. Different techniques may be used. For example dividing component in the frequency domain by a constant for that component, and rounding to the nearest integer (resulting in higher frequency components rounded to zero and the rest of the values are small numbers). Other quantization methods may be used and are consistent with the present techniques, e.g., truncation, mid-riser or mid-tread quantization.

In some cases, the different frequency components are quantized differently, e.g., using smaller, higher-resolution quanta for lower-frequency components and vice versa. In some cases, the quanta may be expressed in a quantization matrix of a size matching the output of the DCT. The result, in some embodiments, for each segment, is a matrix of quantized amplitude values for the different frequencies, often with many higher frequency values set to zero as a result of the quantization process, depending on their respective quantization thresholds in the quantization matrix.

In some embodiments, input data 210 (original data) is input to a second DCT-based compression algorithm. In some cases, the second compression may be done concurrently (or before or after the first DCT-based compression algorithm is executed).

Figure 3:
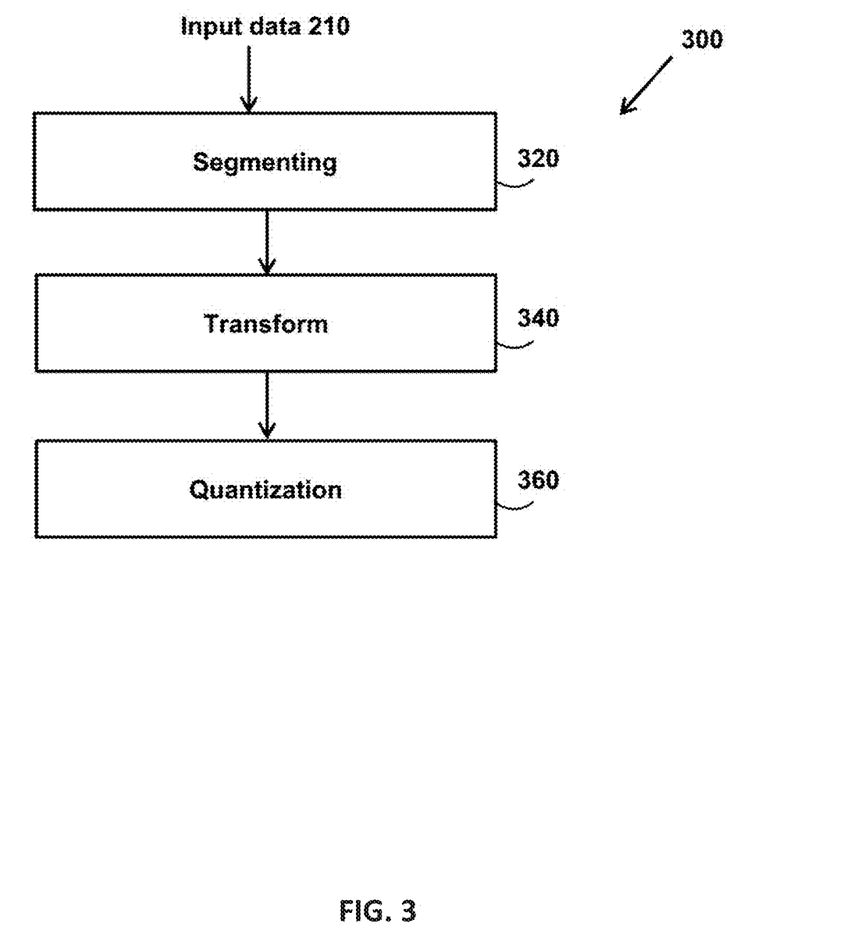
FIG. 3 illustrates an example of a second process by which some embodiments of the present techniques may be implemented.

FIG. 3 illustrate an example of operations 300 of the second DCT-based compression. The second DCT-based algorithm may have the same steps as the first (segmentation 320, transform 340, and quantization 360), except that the second algorithm (transform 340) is configured for higher (and more lossy) compression relative to the first. As a result, two matrices may be produced for each segment. In some embodiments, the DCT may be performed once for a given block, and the quantization step may be performed twice on the DCT output, once with a high-quality quantization constant (or high quantization matrix) and once with a lower-quality quantization constant (or quantization matrix).

In some embodiments, quantization may include dividing (in the sense of grouping into bins, or ranges) the DCT values according to ranges specified by the DCT constant. For instance, values of 1.2478 and 2.6321 may be quantized with a constant of 0.1, resulting in quantized values of 1.2 and 2.6, which consume less data, but also results in a loss of detail. Or, in another example, the values 1.2478 and 2.6321 may be quantized with a constant of 0.01, resulting in quantized values of 1.24 and 2.63, which consume more data than the first example, but afford higher quality.

In some embodiments, a hybrid matrix may be created by mixing values from the first matrix and values from the second matrix. For example, certain values in the first matrix may be substituted for corresponding values in the second matrix, by inserting values produced by the lower-compression rate algorithm into the matrix produced by the higher-compression rate (and more lossy) algorithm. This may include forming a new hybrid matrix by taking values from the two different matrixes, rather than replacing values in a copy of an extant matrix. The result, in some embodiments, is a single matrix that is a hybrid of the low-compression rate matrix and the high-compression rate matrix. Substitution of values may be based on a threshold frequency, bite rate, or data loss rate. For example, the number of values from the first matrix (produced by the lower-compression rate algorithm) inserted into the second matrix (produced by the higher-compression rate) may be defined by a user based on a threshold quality, or a threshold size of the final compressed data. In some cases, values from the first matrix are dynamically inserted in the second matrix (dynamically adjusting the resulting hybrid matrix). For example, based on bandwidth, data rate, storage size, or quality. In some embodiments, thresholds depend on the type of data being compressed (image, audio, video, etc.), and whether the compressed data will be further processed (further compression or editing.

In some embodiments, only the DC value is replaced. Or in some embodiments, the DC value and a threshold number of the lowest-frequency AC components are replaced (e.g., one, two, or three, AC components). Some embodiments may override the data value of the DC component in low quality (e.g., obtained with the low-quality quantization constant) with data value of the DC component in high quality (e.g., obtained with the high-quality quantization constant). In some cases, this override may be performed dynamically or "on the fly" in real time (or near-real time) while streaming video. In some cases, the parameters of the overriding value (or values) may be selected based on current network conditions, e.g., by selecting a higher quality quantization constant when unused bandwidth is greater than a threshold or packet loss is less than a threshold or vice versa.

Some embodiments may encode DC and AC values of the quantized and modified (e.g., with the override) matrix, for instance, by encoding the overridden low-quality matrix having a DC component from the higher quality quantization. In some embodiments, the resultant matrix may undergo additional compression, e.g., with a lossless compression algorithm, like Huffman coding or arithmetic coding, to further reduce the size of (for instance, a serialized encoding of) the hybrid matrix. This may be repeated for each of a plurality of segments by which the original data was composed. The resulting file or stream is generally substantially smaller than the original data. The compressed data may then be stored or transmitted.

Upon decompression, a relatively high-quality representation of the original data is obtained. The hybrid matrices described above substantially reduce the "blocky" artifact in the decompressed image for a given compression rate. As a result, data may be compressed with higher quality at a given bit rate, data may be compressed with a given quality at a lower bit rate, or a combination thereof, relative to conventional techniques. The techniques described here may be used for compressing different types of data. For example, in the case of audio files, compressor 140 may be an audio compressor. In these embodiments, compressor 140 reduces the size of the audio files by reducing fidelity thereby reducing size and bandwidth needed for storage or transmission of the compressed audio files.

Figure 4:
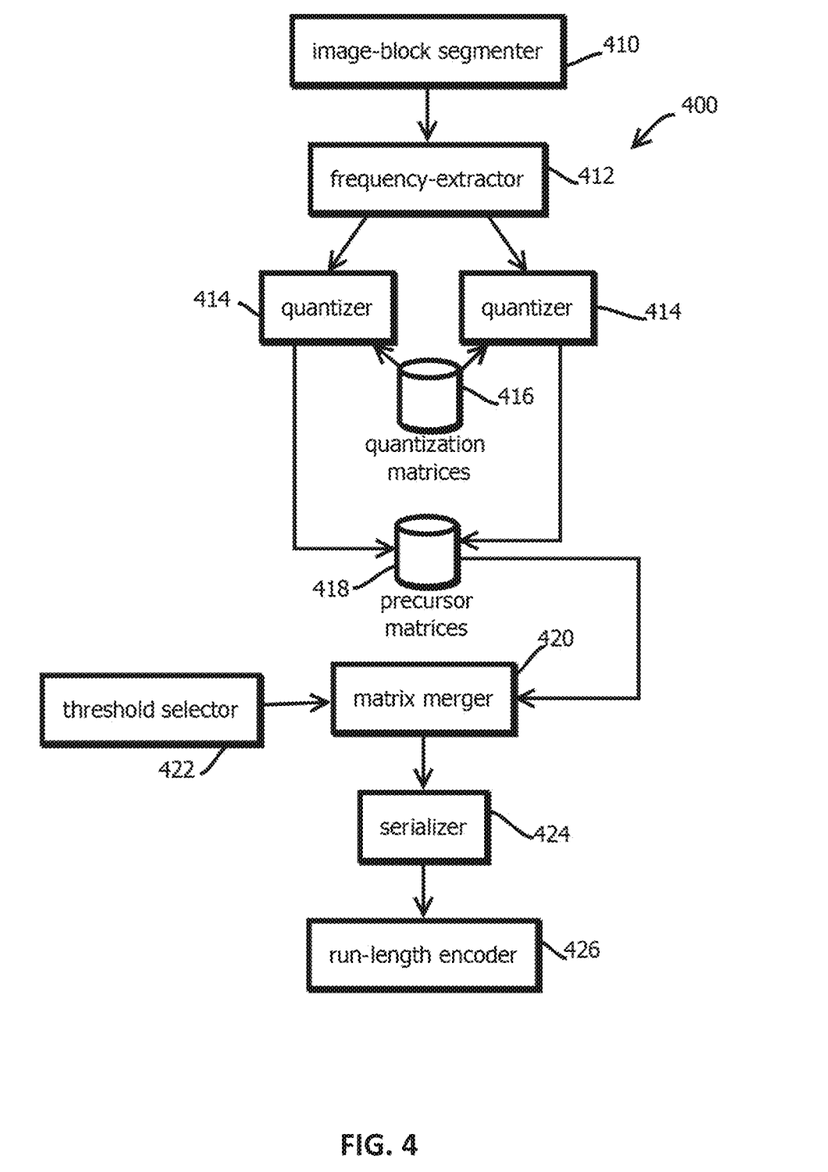
FIG. 4 illustrates an example of a compressor by which some embodiments of the present techniques may be implemented.

FIG. 4 shows an example of the described compressor 140. In some embodiments, the compressor 140 may include one or more components in the illustrated compressor 400 of FIG. 4. In some embodiments, each of these components may be software modules, such as functional blocks of code or hardcoded components, such as in hardware accelerators configured for video processing. Some embodiments may include an image-block segmenter 410 operative to receive one or more images, for example, in a video file or single still images. In some embodiments, the image-block segmenter 410 may segment the image into blocks of adjacent pixels. For example 8×8 blocks of pixels or 10×10 blocks. Some embodiments may segment multiple channels of an image, for example, a different block of pixels may be formed for each of red, blue, and green sets of pixel intensity values corresponding to the same locations in an image.

In some embodiments, the segmented blocks of pixels, for example, several hundred or several thousand, depending upon image size and block size, may be sent to the frequency-extractor 412. In some embodiments, the frequency extractor 412 may be operative to perform the above-describe techniques by which different frequency components are extracted from blocks of images, for example, one of the forms of Discrete Cosine Transform described above. In some cases, the frequency is a frequency of variation in pixel intensity along a given dimension, such as vertically or horizontally, along a spatial dimension of an image (e.g., corresponding to pixel position vertically or horizontally). Some embodiments may include a plurality of frequency-extractors is configured to operate concurrently on the segmented blocks, for example, implemented in multiple parallel hardware accelerators, in parallel pipelines of a graphical processing unit, or multiple processes on a multicore processor. In some embodiments, the frequency extractor 412 may transform each segmented block of pixels into a discrete cosine transform respective matrix.

In some embodiments, each of the discrete cosine transform matrices may be output to two different quantizers 414. Or some embodiments may include additional quantizers (that are differently configured in the manner described below) to which each of the discrete cosine transform matrices are output. In some cases, two copies of each discrete cosine transform matrix may be created and passed to the different quantized rooms for 14, or some embodiments may pass a pointer to a single copy to both of the quantizers 414, one to each. In some embodiments, the two quantizers 414 may be referred to as a quantizer set, and some embodiments may include a plurality of quantizer sets that operate concurrently on each of the discrete cosine transform matrices, for instance, with the various forms of parallelization described above implemented in the frequency extractor 412.

In some embodiments, each of the quantizers 414 may be configured to quantize the discrete cosine transform matrix differently, for example, corresponding to different compression rates, with different loss ratios and compression rates. In some embodiments, each of the quantizers 414 may retrieve a different quantization matrix from the quantization matrices repository 416 and apply that different quantization matrix to the respective discrete cosine transform matrix from the frequency-extractor 412. In some embodiments, one of the quantizers 414 may retrieve a quantization matrix that more aggressively discards information at higher frequencies than the other quantization matrix retrieved by the other one of the quantizers 414. In some embodiments, the quantizers 414 may divide each value in the discrete cosine transform matrix by a value in the respective quantization matrix retrieved (or otherwise obtained) by the quantizer 414, and those values may vary in different positions corresponding to different frequency components. Some embodiments may round resulting values from this division downward, for example, rounding values between zero and one down to zero. Some embodiments may set resulting values less than a threshold to zero, pruning the matrix.

In some embodiments, each of the quantizers 414 may output a different version of the same discrete cosine transform matrix that is been differently quantized, and thus, differently transformed. In some cases, these different versions may each be referred to as a discrete cosine transform amplitude matrix. Or in some cases, intermediate versions of the discrete cosine transform matrix that have been partially or fully processed by the quantizers 414 may also serve as types of a discrete cosine transform amplitude matrix, for instance versions that have been combined with the respective quantization matrix (e.g., through division of values in corresponding positions) but have not yet been subject to rounding or application of thresholds to resulting values.

Some embodiments may store these resulting discrete cosine transform amplitude matrices in the precursor matrix repository 418 illustrated in FIG. 4. In some embodiments, each image in each frame of a video may be associated with a plurality of discrete cosine transform amplitude matrix sets in the precursor matrix repository 418, and each set may correspond to a different one of the quantizers 414. Thus, for example, a given segmented image block may correspond to multiple discrete cosine compression amplitude matrices in the precursor matrix repository 418. In some embodiments, each of these versions may be associated with an identifier of the quantizer 414 that produced the version of the discrete cosine transform amplitude matrix. For example, each differently processed instance of a discrete cosine transform matrix, corresponding to a different quantizer 414 and the same image block, may be labeled with a value indicative of an amount of compression.

Upon forming the precursor matrices (e.g., in real time, like within ten seconds), or sometime afterwards, like days or weeks afterward, the illustrated matrix merger 420 may combine different discrete cosine transform amplitude matrices representing the same image block segment using the techniques described above.

For example, the matrix merger 420 may identify a given image block segment and the first and second version of a discrete cosine transform amplitude matrix representing that image block segment. In some embodiments, the matrix merger 420 may receive a threshold from a threshold selector 422. In some embodiments, the matrix merger may extract values of the first discrete cosine transform amplitude matrix in positions corresponding to a frequency greater than the threshold. In some embodiments, the matrix merger 420 may extract values from the second discrete cosine transform amplitude matrix that are in positions corresponding to less than or equal to the threshold frequency. In some cases, the threshold frequency may be expressed as a position, e.g., a value of 1 for the first row and column, or a value of 2 for the first two. For example, the threshold may be sent to a value that causes a DC component of the first discrete cosine transform amplitude matrix to be extracted and the remainder of the values to be taken from the second discrete cosine transform amplitude matrix. In some cases, this can be analogized to drawing a box over the top left corner of a matrix, depending upon how the matrix is organized, and taking the values in the box from one version and combining them with values from the other version of matrix in positions outside the same box.

Some embodiments may form a hybrid discrete cosine transform amplitude matrix from these extracted values. For example, some embodiments may maintain the position in the matrix of the extracted values in the hybrid discrete cosine temple amplitude matrix (e.g., a value extracted from row 1, column 1, may be placed in row 1, column 1 of the hybrid matrix; row 1, column 2 may be placed in row 1, column 2, and so on). In some cases, the number of dimensions of the hybrid discrete cosine transform amplitude matrix may be the same as the number of dimensions in the first and second discrete cosine transform amplitude matrices.

In some embodiments, values corresponding to a frequency greater than the threshold may be selected from the discrete cosine transform amplitude matrix having a less lossy form of transformation by the quantizers 414, and values and positions corresponding to frequencies more than or equal to the threshold from the threshold selector 422 may be taken from the discrete cosine transform amplitude matrix produced by the quantizer 414 having a more lossy quantization matrix, that is one configured to compressed to a greater degree, which may also be referred to as a greater compression rate. In some cases, the compression rate may be a ratio of an amount of bytes in a representation of a portion of an image before compression to an amount of bytes in representation of the portion of the image after compression.

The threshold selector 422 may select thresholds according to a variety of different techniques. In some embodiments, the threshold is a fixed value. Or in some embodiments, the threshold may be selected dynamically, for instance, responsive to various attributes of the data being compressed or a network or client device that is received transmitting or receiving the compressed data. For example, in some embodiments, the threshold selector 422 may determine a bit rate of the data being compressed, for instance, an average amount of data per second of bandwidth required to transmit a video being compressed by the current portion of the video being compressed (e.g., over a trailing duration, like the previous ten seconds). Some embodiments may modulate the threshold responsive to this bit rate, for example, to target a bit rate setpoint, moving the threshold closer to DC, to values corresponding to lower frequencies, responsive to the measured bit rate increasing above the target, and vice versa. Thus, some embodiments may dynamically change how much of the different direct cosine transform amplitude matrices are taken from each of the two versions based on a bit rate.

In another example, the threshold selector 422 may modulate the threshold according to an amount of available bandwidth on a network over which the compressed video is being transmitted. For example, some embodiments may transmit with a first threshold for a first portion of a video, determined that bandwidth is decreased or that packet loss has increased below or above a threshold, respectively, and in response adjust the threshold to a lower frequency, reducing the amount of information taken from the low compression rate version of the data and increasing the amount of information taken from a high compression rate version. In another example, different versions of the compressed data may be formed and stored in memory corresponding to different bandwidths in advance of transmission. For example, some embodiments may form and store a copy with compression where the threshold is set to one frequency, and form and store another copy with the compression a set of different threshold frequency. (Or similar techniques may be applied by applying different quantization matrices in the quantizers 414 to for multiple copies that embodiments may select upon among according to available bandwidth or resources available at a recipient computing device, for instance, selecting higher compression rate copies responsive to computing devices having smaller displays or fewer computing resources.

In some embodiments, the hybrid amplitude matrix may be sent to a serializer 424. In some embodiments, the serializer 424 may serialize matrices, for example, following is a zigzag pattern in which the order of values and alternating rows is reversed, and one row is appended to the end of the next row. Or similar techniques may be applied to columns or embodiments in which a zigzag pattern is not applied, for instance, where one row is appended to the end of the other without reversing the order.

In some embodiments, the serialized hybrid discrete cosine transform amplitude matrix may be sent to a run length encoder 426. In some embodiments, the run-length encoder may iterate through the resulting serialized sequence and encode sequences that have the same value consecutively with an indication of the length. For instance, a token indicating that the next twenty values are zero may replace a sequence of twenty zeros. Or some embodiments may implement a dictionary coder, e.g., by replacing sequences following a pattern with a description of the pattern. The resulting encoded data may represent the input data in compressed form.

It should be noted that references to "compressing the data" do not require than an entire compression process be run to completion. The phrase also encompasses partial execution of these processes to produce intermediate results, and data subject to these partial executions of the processes may not yet be smaller in size than the original data. For instance, "compressing the data" may include calculating the DCT matrix and quantizing the DCT matrix, but not yet forming a hybrid matrix, serializing the data, or performing run-length coding. Further, it should be noted that the operations described above may be performed in a different order (which is not to imply that other descriptions are limiting), for instance, values may be taken from the different DCT amplitude matrices after those matrices have undergone subsequent processing (e.g., after serialization or after run-length coding (provided that run-lengths do not change or that run-lengths are updated to reflect the changes). Further, references to different DCT compression algorithms include scenarios where configuration parameters are the sole difference between the different DCT compression algorithms (e.g., different quantization matrices) and do not require, for instance, different generations of DCT compression, like DCT-I and DCT-II.

Figure 5:
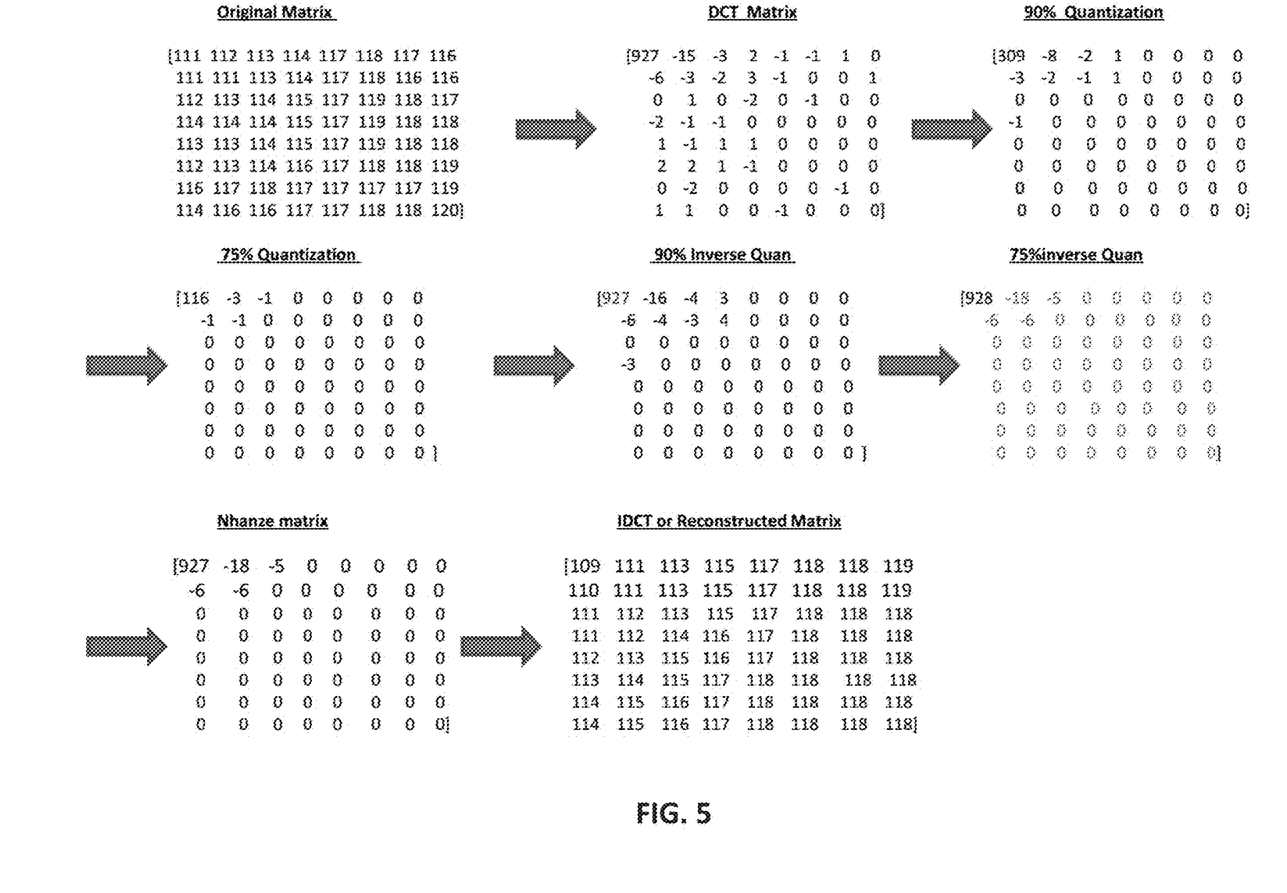
FIG. 5 illustrates an example of a set of matrix operations by which some embodiments of the present techniques may be implemented.

FIG. 5 shows an example of matrix operations consistent with the present techniques. In some cases, the hybrid matrix described above may be referred to as an Nhanze matrix. This and other examples are described in the provisional application to which priority is sought above, the contents of which are incorporated by reference. The provisional application further includes examples of images depict before and after compression and demonstrating the efficacy of some of the present techniques.

Figure 6:
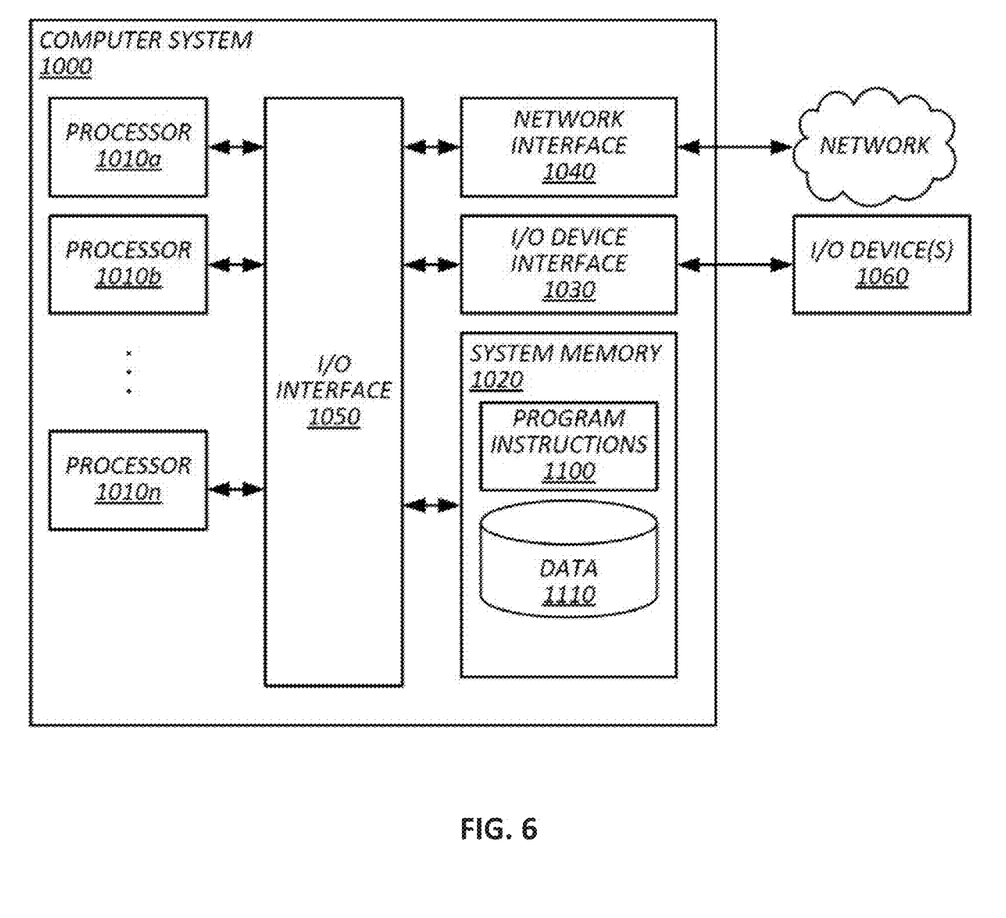
FIG. 6 illustrates an example of a computer system by which the present techniques may be implemented.

FIG. 6 is a diagram that illustrates an exemplary computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010a-1010n) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010*a*), or a multi-processor system including any number of suitable processors (e.g., 1010*a*-1010*n*). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010*a*-1010*n*) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010*a*-1010*n*) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times, e.g., a copy may be created by writing program code to a first-in-first-out buffer in a network interface, where some of the instructions are pushed out of the buffer before other portions of the instructions are written to the buffer, with all of the instructions residing in memory on the buffer, just not all at the same time.

I/O interface 1050 may be configured to coordinate I/O traffic between processors 1010*a*-1010*n*, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010*a*-1010*n*). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present invention may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several inventions. Rather than separating those inventions into multiple isolated patent applications, applicants have grouped these inventions into a single document because their related subject matter lends itself to economies in the application process. But the distinct advantages and aspects of such inventions should not be conflated. In some cases, embodiments address all of the deficiencies noted herein, but it should be understood that the inventions are independently useful, and some embodiments address only a subset of such problems or offer other, unmentioned benefits that will be apparent to those of skill in the art reviewing the present disclosure. Due to costs constraints, some inventions disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such inventions or all aspects of such inventions.

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "an element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

In this patent, certain U.S. patents, U.S. patent applications, or other materials (e.g., articles) have been incorporated by reference. The text of such U.S. patents, U.S. patent applications, and other materials is, however, only incorporated by reference to the extent that no conflict exists between such material and the statements and drawings set forth herein. In the event of such conflict, any such conflicting text in such incorporated by reference U.S. patents, U.S. patent applications, and other materials is specifically not incorporated by reference in this patent.

The present techniques will be better understood with reference to the following presentation that describes one embodiment. As a description of an embodiment, the presentation should not be taken as limiting to the scope of the presently described techniques:

1. A method for compressing data, the method comprising: obtaining, with one or more processors, video or other image data to be compressed; compressing, with one or more processors, the data with a first discrete cosine transform (DCT) compression algorithm to obtain a first DCT amplitude matrix, wherein: the first DCT compression algorithm has a first compression rate; the first DCT amplitude matrix comprises a plurality of rows corresponding to different respective frequencies of variation in the data in a first direction; and the first DCT amplitude matrix comprises a plurality of columns corresponding to different respective frequencies of variation in the data in a second direction; compressing, with one or more processors, the data with a second DCT compression algorithm to obtain a second DCT amplitude matrix, wherein: the second DCT compression algorithm has a second compression rate that is a higher compression rate than the first compression rate; the second DCT amplitude matrix comprises a plurality of rows corresponding to different respective frequencies of variation in the data in the first direction; the second DCT amplitude matrix comprises a plurality of columns corresponding to different respective frequencies of variation in the data in the second direction; and the first DCT amplitude matrix and the second DCT amplitude matrix represent the same data compressed by differing forming, with one or more processors, a hybrid DCT amplitude matrix based on both at least part of the first DCT amplitude matrix and at least part of the second DCT amplitude matrix, the hybrid DCT amplitude matrix comprises at least some values from the first DCT amplitude matrix and at least some values from the second DCT amplitude matrix; and saving the hybrid DCT amplitude matrix or compressed data based on the hybrid DCT amplitude matrix to memory or sending the hybrid DCT amplitude matrix or compressed data based on the hybrid DCT amplitude matrix over a network.

2. The method of embodiment 1, comprising: modifying the second DCT amplitude matrix based on a first set of values in the first DCT amplitude matrix, wherein modifying includes replacing a second set of values in the second DCT amplitude matrix with the first set of values, the second set of values corresponding to the first set of values in the second amplitude matrix.

3. The method of any one of embodiments 1-2, wherein the at least some values from the first DCT amplitude matrix include a direct current (DC) component with corresponding value from the first amplitude matrix.

4. The method of any one of embodiments 1-3, wherein the at least some values from the second DCT amplitude matrix include highest-frequency alternative current (AC) component corresponding values from the second DCT amplitude matrix.

5. The method of any one of embodiments 1-4, comprising: dynamically forming the hybrid DCT amplitude matrix based on a threshold value that changes during compression of a video.

6. The method of embodiment 5, comprising: obtaining bit rate information indicative of data transmission rate of the compressed data over a network; obtaining a bit rate target; and adjusting the threshold based on difference between the bit rate target and a bit rate of the video.

7. The method of any one of embodiments 1-6, comprising: obtaining data loss information indicative of amount of data lost in compression; obtaining a data loss threshold; and determining that the obtained data loss information exceeds the threshold and in response adjusting a number of values in the first DCT amplitude matrix combined with the second DCT amplitude matrix in the hybrid DCT amplitude matrix.

8. The method of any one of embodiments 1-7, comprising: segmenting an image into blocks of adjacent pixels and determining hybrid DCT amplitude matrices for each respective block of adjacent pixels.

9. The method of embodiment 8, wherein: a threshold frequency used to determine which values of the respective hybrid DCT amplitude matrices for each respective block come from which of the first and second DCT compression algorithms is different for different blocks of adjacent pixels in the image.

10. The method of any one of embodiments 1-9, wherein: the first DCT compression algorithm has a first quantization matrix; and the second DCT compression algorithm has a second quantization matrix that is different from the first quantization matrix.

11. The method of any one of embodiments 1-10, comprising: serializing the hybrid DCT amplitude matrix.

12. The method of embodiment 11, comprising: encoding the serialized DCT amplitude matrix with run-length coding to form a compressed bitstream representation of video.

13. The method of embodiment 12, wherein: the compressed bitstream representation of video is configured to be decoded by a decoder operative to decode data compressed by a single one of the first DCT compression algorithm and the second DCT compression algorithm.

14. A system comprising: one or more computer processors; and storage media, storing machine-readable instructions that, when executed by at least some of the one or more processors, cause operations comprising: the steps of any of embodiments 1-13.

15. A tangible, non-transitory machine-readable media storing instructions that when executed by a data processing apparatus, cause the apparatus to effectuate the operations of any of embodiments 1-13.

What is claimed is:

1. A method for compressing data, the method comprising:
    obtaining, with one or more processors, video or other image data to be compressed;
    compressing, with one or more processors, the data with a first discrete cosine transform (DCT) compression algorithm to obtain a first DCT amplitude matrix, wherein:
        the first DCT compression algorithm has a first compression rate;
        the first DCT amplitude matrix comprises a plurality of rows corresponding to different respective frequencies of variation in the data in a first direction; and
        the first DCT amplitude matrix comprises a plurality of columns corresponding to different respective frequencies of variation in the data in a second direction;
    compressing, with one or more processors, the data with a second DCT compression algorithm to obtain a second DCT amplitude matrix, wherein:
        the second DCT compression algorithm has a second compression rate that is a higher compression rate than the first compression rate;
        the second DCT amplitude matrix comprises a plurality of rows corresponding to different respective frequencies of variation in the data in the first direction;
        the second DCT amplitude matrix comprises a plurality of columns corresponding to different respective frequencies of variation in the data in the second direction; and
        the first DCT amplitude matrix and the second DCT amplitude matrix represent the same data compressed by differing amounts;
    forming, with one or more processors, a hybrid DCT amplitude matrix based on both at least part of the first DCT amplitude matrix and at least part of the second DCT amplitude matrix, the hybrid DCT amplitude matrix comprises at least some values from the first DCT amplitude matrix and at least some values from the second DCT amplitude matrix; and
    saving the hybrid DCT amplitude matrix or compressed data based on the hybrid DCT amplitude matrix to memory or sending the hybrid DCT amplitude matrix or compressed data based on the hybrid DCT amplitude matrix over a network.

2. The method of claim 1, comprising:
    modifying the second DCT amplitude matrix based on a first set of values in the first DCT amplitude matrix, wherein modifying includes replacing a second set of values in the second DCT amplitude matrix with the first set of values, the second set of values corresponding to the first set of values in the second amplitude matrix.

3. The method of claim 1, wherein the at least some values from the first DCT amplitude matrix include a direct current (DC) component with corresponding value from the first amplitude matrix.

4. The method of claim 1, wherein the at least some values from the second DCT amplitude matrix include highest-frequency alternative current (AC) component corresponding values from the second DCT amplitude matrix.

5. The method of claim 1, comprising:
    dynamically forming the hybrid DCT amplitude matrix based on a threshold value that changes during compression of a video.

6. The method of claim 5, comprising:
    obtaining bit rate information indicative of data transmission rate of the compressed data over a network;
    obtaining a bit rate target; and
    adjusting the threshold based on difference between the bit rate target and a bit rate of the video.

7. The method of claim 1, comprising:
    obtaining data loss information indicative of amount of data lost in compression;
    obtaining a data loss threshold; and
    determining that the obtained data loss information exceeds the threshold and in response adjusting a number of values in the first DCT amplitude matrix combined with the second DCT amplitude matrix in the hybrid DCT amplitude matrix.

8. The method of claim 1, comprising:
    segmenting an image into blocks of adjacent pixels and determining hybrid DCT amplitude matrices for each respective block of adjacent pixels.

9. The method of claim 8, wherein:
    a threshold frequency used to determine which values of the respective hybrid DCT amplitude matrices for each respective block come from which of the first and second DCT compression algorithms is different for different blocks of adjacent pixels in the image.

10. The method of claim 1, wherein:
    the first DCT compression algorithm has a first quantization matrix; and
    the second DCT compression algorithm has a second quantization matrix that is different from the first quantization matrix.

11. The method of claim 1, comprising:
    serializing the hybrid DCT amplitude matrix.

12. The method of claim 11, comprising:
    encoding the serialized DCT amplitude matrix with run-length coding to form a compressed bitstream representation of video.

13. The method of claim 12, wherein:
    the compressed bitstream representation of video is configured to be decoded by a decoder operative to decode data compressed by a single one of the first DCT compression algorithm and the second DCT compression algorithm.

14. The method of claim 1, comprising:
    steps for forming a discrete cosine transform.

15. The method of claim 1, comprising:
    steps for forming a hybrid DCT amplitude matrix.

16. The method of claim 1, comprising:
    steps for adjusting a threshold frequency for combining two versions of a DCT amplitude matrix.

17. A tangible, non-transitory, machine-readable medium storing instructions that when executed by one or more computers effectuate operations of compressing data, the operations comprising:
    obtaining, with one or more processors, video or other image data to be compressed;

compressing, with one or more processors, the data with a first discrete cosine transform (DCT) compression algorithm to obtain a first DCT amplitude matrix, wherein:
   the first DCT compression algorithm has a first compression rate;
   the first DCT amplitude matrix comprises a plurality of rows corresponding to different respective frequencies of variation in the data in a first direction; and
   the first DCT amplitude matrix comprises a plurality of columns corresponding to different respective frequencies of variation in the data in a second direction;
compressing, with one or more processors, the data with a second DCT compression algorithm to obtain a second DCT amplitude matrix, wherein:
   the second DCT compression algorithm has a second compression rate that is a higher compression rate than the first compression rate;
   the second DCT amplitude matrix comprises a plurality of rows corresponding to different respective frequencies of variation in the data in the first direction;
   the second DCT amplitude matrix comprises a plurality of columns corresponding to different respective frequencies of variation in the data in the second direction; and
   the first DCT amplitude matrix and the second DCT amplitude matrix represent the same data compressed by differing amounts;
forming, with one or more processors, a hybrid DCT amplitude matrix based on both at least part of the first DCT amplitude matrix and at least part of the second DCT amplitude matrix, the hybrid DCT amplitude matrix comprises at least some values from the first DCT amplitude matrix and at least some values from the second DCT amplitude matrix; and
saving the hybrid DCT amplitude matrix or compressed data based on the hybrid DCT amplitude matrix to memory or sending the hybrid DCT amplitude matrix or compressed data based on the hybrid DCT amplitude matrix over a network.

18. The medium of claim 17, the operations comprising modifying the second DCT amplitude matrix based on a first set of values in the first DCT amplitude matrix, wherein modifying includes replacing a second set of values in the second DCT amplitude matrix with the first set of values, the second set of values corresponding to the first set of values in the second amplitude matrix.

19. The medium of claim 17, wherein the at least some values from the first DCT amplitude matrix include a direct current (DC) component with corresponding value from the first amplitude matrix.

20. The medium of claim 17, wherein the at least some values from the second DCT amplitude matrix include highest-frequency alternative current (AC) component corresponding values from the second DCT amplitude matrix.

* * * * *